US012750136B2

(12) United States Patent
Chen et al.

(10) Patent No.: US 12,750,136 B2
(45) Date of Patent: Sep. 29, 2026

(54) EVALUATING FIBER CONNECTION RELIABILITY USING MULTI-MODAL DATA AND/OR MULTI-MODAL DATA SOURCES

(71) Applicant: AT&T Intellectual Property I, L.P., Atlanta, GA (US)

(72) Inventors: Xiao Chen, Palo Alto, CA (US); Russell Bellford, New Berlin, WI (US); Neilay Shahi, San Jose, CA (US); Zhengye Liu, Pleasanton, CA (US); Yali Liu, Dublin, CA (US); Jin Wang, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 327 days.

(21) Appl. No.: 18/640,719

(22) Filed: Apr. 19, 2024

(65) Prior Publication Data

US 2025/0330239 A1 Oct. 23, 2025

(51) Int. Cl.
*H04B 10/079* (2013.01)

(52) U.S. Cl.
CPC ..... *H04B 10/0793* (2013.01); *H04B 10/0791* (2013.01); *H04B 10/0795* (2013.01)

(58) Field of Classification Search
CPC ............ H04B 10/0793; H04B 10/0791; H04B 10/0795; H04M 15/47; H04M 3/2218; H04M 3/2281; G06N 20/00; H04W 8/26
See application file for complete search history.

(56) References Cited

U.S. PATENT DOCUMENTS 11,528,189 B1 * 12/2022 Egri ........................ H04L 41/12
2015/0124711 A1 * 5/2015 Krinsky .................. H04W 8/22 370/329
2017/0150311 A1 * 5/2017 Krinsky ................ H04L 1/0061
2017/0177901 A1 * 6/2017 Lancaster ........... G06F 21/6245

* cited by examiner

*Primary Examiner* — Pranesh K Barua
(74) *Attorney, Agent, or Firm* — Guntin & Gust, PLC; Louis Yang

(57) ABSTRACT

Aspects of the subject disclosure may include, for example, receiving first data associated with users of a communication system; receiving second data associated with the users, wherein each data point of the second data has been obtained at a data capture frequency different from the data points of the first data; grouping together, for a first particular user of the plurality of users, each data point of the first data that has a first identifier corresponding to the first particular user, wherein the grouping together of each data point of the first data results in a first data set for the first particular user; grouping together, for the first particular user, each data point of the second data that has the first identifier corresponding to the first particular user, wherein the grouping together of each data point of the second data results in a second data set for the first particular user; and determining, based upon the first and second data sets, a shorter-term connection reliability value for the first particular user and a longer-term connection reliability value for the first particular user. Other embodiments are disclosed.

20 Claims, 12 Drawing Sheets

2000

1000

1100

ONT Alarm Summary

| Alarm | Type | Mean | Min | Max | Sum | Count |
|---|---|---|---|---|---|---|
| DG | MJ | 110.0 | 110 | 110 | 110 | 1 |
| INACT | MJ | 218.33 | 90 | 475 | 655 | 3 |

FIG. 1D

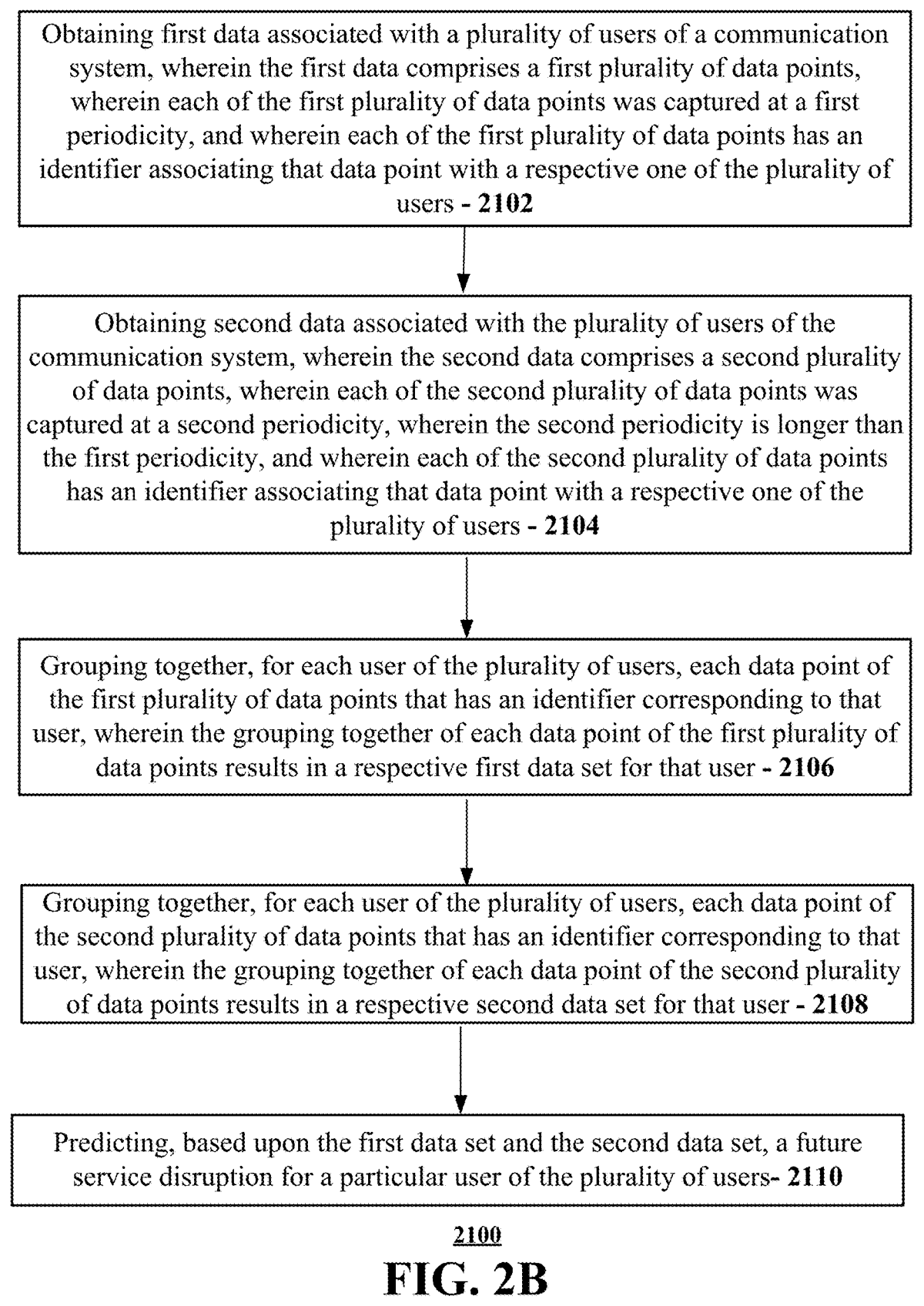

Obtaining first data associated with a plurality of users of a communication system, wherein the first data comprises a first plurality of data points, wherein each of the first plurality of data points was captured at a first periodicity, and wherein each of the first plurality of data points has an identifier associating that data point with a respective one of the plurality of users - 2102

↓

Obtaining second data associated with the plurality of users of the communication system, wherein the second data comprises a second plurality of data points, wherein each of the second plurality of data points was captured at a second periodicity, wherein the second periodicity is longer than the first periodicity, and wherein each of the second plurality of data points has an identifier associating that data point with a respective one of the plurality of users - 2104

↓

Grouping together, for each user of the plurality of users, each data point of the first plurality of data points that has an identifier corresponding to that user, wherein the grouping together of each data point of the first plurality of data points results in a respective first data set for that user - 2106

↓

Grouping together, for each user of the plurality of users, each data point of the second plurality of data points that has an identifier corresponding to that user, wherein the grouping together of each data point of the second plurality of data points results in a respective second data set for that user - 2108

↓

Predicting, based upon the first data set and the second data set, a future service disruption for a particular user of the plurality of users- 2110

2100

FIG. 2B

EVALUATING FIBER CONNECTION RELIABILITY USING MULTI-MODAL DATA AND/OR MULTI-MODAL DATA SOURCES

FIELD OF THE DISCLOSURE

The subject disclosure relates to evaluating fiber connection reliability using multi-modal data and/or multi-modal data sources.

BACKGROUND

Various conventional network diagnostic tools provide instantaneous functionalities to assess the network connection status and troubleshoot issues. For example, some modern firmware in a Residential Gateway (RG) has the capability to initiate speed test queries to obtain the status of network connection speed.

Two specific examples of conventional network diagnostic tools are the Near-Real Time Detection of Gateway out of Service (GooSe) system and the End-to-End Incident Management (EEIM) system. These systems provide outage alarms by constantly receiving light-weight Hypertext Transfer Protocol (HTTP) requests from an RG (the firmware in the RG is configured to send requests that comprise manufacture, device class, and serial number information) within a short period (e.g., 3 to 5 minutes) or monitoring the network card on server side (e.g., error code from network card connection).

Further, a conventional type of data related to network diagnostics is the Remote Authentication Dial-In User Services (RADIUS) data (that represents the status of software/application layer of the connection). Specifically, the RADIUS data covers the network segment between the Network Access Server (NAS) that is usually hosted in modem-like device such as Residential Gateway (RG) to a centralized authentication server that can be in Optical Line Terminal (OLT) offices.

Further still, a conventional type of data related to network diagnostics is the RG outage data (that represents the RG status by constantly receiving light-weight web requests). Specifically, the RG outage data describes the RG status that is configured intrinsically inside the RG firmware. The data is recorded by monitoring the health of RG connectivity. Such connectivity is implemented by constantly sending light-weight HTTP requests from RGs to backend servers.

Further still, a conventional type of data related to network diagnostics is ONT alarm data (that covers the segment between the NAS to Primary Flexibility Point (PFP) which can be a (curbside) cabinet that hosts the fiber optical splitters). The ONT alarm data usually monitors the errors when translating optical signals to electronic power signals (and their relevant firmware errors).

BRIEF DESCRIPTION OF THE DRAWINGS

Reference will now be made to the accompanying drawings, which are not necessarily drawn to scale, and wherein:

FIG. 1D is an example ONT alarm summary table of an embodiment in accordance with various aspects described herein.

FIG. 2B depicts an illustrative embodiment of a method in accordance with various aspects described herein.

DETAILED DESCRIPTION

Figure 1A:
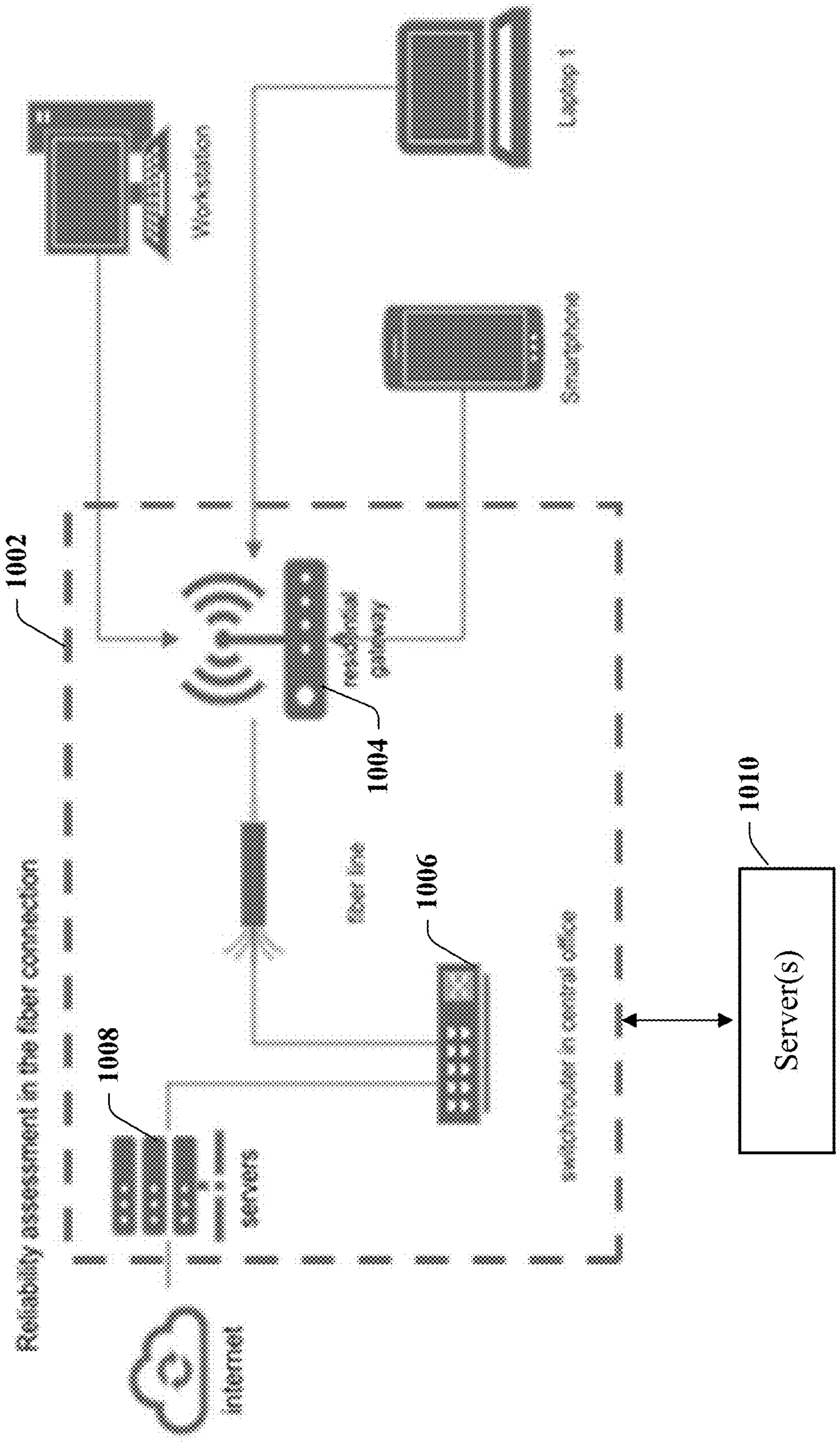
FIG. 1A is a block diagram illustrating an example, non-limiting embodiment of a system in accordance with various aspects described herein.

The subject disclosure describes, among other things, illustrative embodiments for evaluating fiber connection reliability (e.g., fiber connection reliability for residential customers) using multi-modal data and/or multi-modal data sources. Other embodiments are described in the subject disclosure.

Various embodiments provide a tool (e.g., an online tool) that assess the network service reliability of individual fiber customers. Such a tool can utilize multi-modal information including (but not limited to) numerical statistics of connection availability, device error codes, and/or text descriptions of the associated dispatch and customer call tickets. Such a tool can provide a wholistic view to understand how frequently the errors would occur during a certain time horizon, and further diagnose how reliable a fiber service is for a particular customer. Use of multiple data sources—including (but not limited to) the Optical Network Terminal (ONT) alarm data, Remote Authentication Dial-In User Services (RADIUS) data, and connection outage data from Residential Gateway's (RG) firmware—yields a robust view of service reliability. Moreover, such a tool can provide a wide range of horizons (e.g., over minutes to weeks and months) to diagnose the connection error(s) and further harness the customer service and operation records (e.g., to help plan infrastructure enhancements from historical insights). Such a tool can also provide an aggregated view of the fiber network reliability based on the large geolocation area and/or network connection topologies (e.g., by Fiber-to-The-Premises hubs or Passive Optic Network ports).

One or more aspects of the subject disclosure include a device, comprising: a processing system including a processor; and a memory that stores executable instructions that, when executed by the processing system, facilitate performance of operations, the operations comprising: receiving first data associated with a plurality of users of a communication system, wherein each data point of the first data has been obtained at a first data capture frequency, and wherein each data point of the first data has a first identifier associating that data point with a respective one of the plurality of users; receiving second data associated with the plurality of users of the communication system, wherein each data point of the second data has been obtained at a second data capture frequency, wherein the second data capture frequency is lower than the first data capture frequency, and wherein each data point of the second data has a second identifier associating that data point with a respective one of the plurality of users; grouping together, for a first particular user of the plurality of users, each data point of the first data that has a first identifier corresponding to the first particular user, wherein the grouping together of each data point of the first data results in a first data set for the first particular user; grouping together, for the first particular user of the plurality of users, each data point of the second data that has the first identifier corresponding to the first particular user, wherein the grouping together of each data point of the second data results in a second data set for the first particular user; and determining, based upon the first data set and the second data set, a shorter-term connection reliability value for the first particular user and a longer-term connection reliability value for the first particular user.

One or more aspects of the subject disclosure include a non-transitory machine-readable medium, comprising executable instructions that, when executed by a processing system including a processor, facilitate performance of operations, the operations comprising: obtaining first data associated with a plurality of users of a communication system, wherein the first data comprises a first plurality of data points, wherein each of the first plurality of data points was captured at a first periodicity, and wherein each of the first plurality of data points has an identifier associating that data point with a respective one of the plurality of users; obtaining second data associated with the plurality of users of the communication system, wherein the second data comprises a second plurality of data points, wherein each of the second plurality of data points was captured at a second periodicity, wherein the second periodicity is longer than the first periodicity, and wherein each of the second plurality of data points has an identifier associating that data point with a respective one of the plurality of users; grouping together, for each user of the plurality of users, each data point of the first plurality of data points that has an identifier corresponding to that user, wherein the grouping together of each data point of the first plurality of data points results in a respective first data set for that user; grouping together, for each user of the plurality of users, each data point of the second plurality of data points that has an identifier corresponding to that user, wherein the grouping together of each data point of the second plurality of data points results in a respective second data set for that user; and predicting, based upon the first data set and the second data set, a future service disruption for a particular user of the plurality of users.

One or more aspects of the subject disclosure include a method, comprising: receiving, by a processing system including a processor, higher-frequency captured data associated with a plurality of users of a communication system including at least one fiber optic link, wherein each data point of the higher-frequency captured data has a respective first timestamp indicative of an associated capture time; receiving, by the processing system, lower-frequency captured data associated with the plurality of users of the communication system, wherein each data point of the lower-frequency captured data has a respective second timestamp indicative of an associated capture time; correlating, by the processing system, the higher-frequency captured data and the lower-frequency captured data in order to associate a particular one of the first timestamps with a particular one of the second timestamps; and based at least in part upon association of the particular one of the first timestamps with the particular one of the second timestamps, determining, by the processing system, existence of an occurrence of a service disruption for a particular one of the plurality of users.

Referring now to FIG. 1A, this figure shows a system 1000 in which a customer's service reliability is assessed (this discussion will focus mainly on the network segment 1002 from residential gateway to the core network). In this segment 1002, a residential connection starts from a modem-like device or a residential gateway 1004, and then reaches some aggregated hub 1006 (e.g., central office or intermediate office that has switches and routers), and finally reaches public internet servers 1008. These connections are typically laid out via fiber optic lines. The server(s) 1010 receive data from a number of network elements and (using techniques according to various embodiments described herein) assess the corresponding connections' outages in the segment 1002 according to multiple sources and modalities of data. Of course, while this example shows one workstation, one laptop, and one smartphone connecting with residential gateway 1004, any desired number and types of such end-user devices can be supported.

Figure 1B:
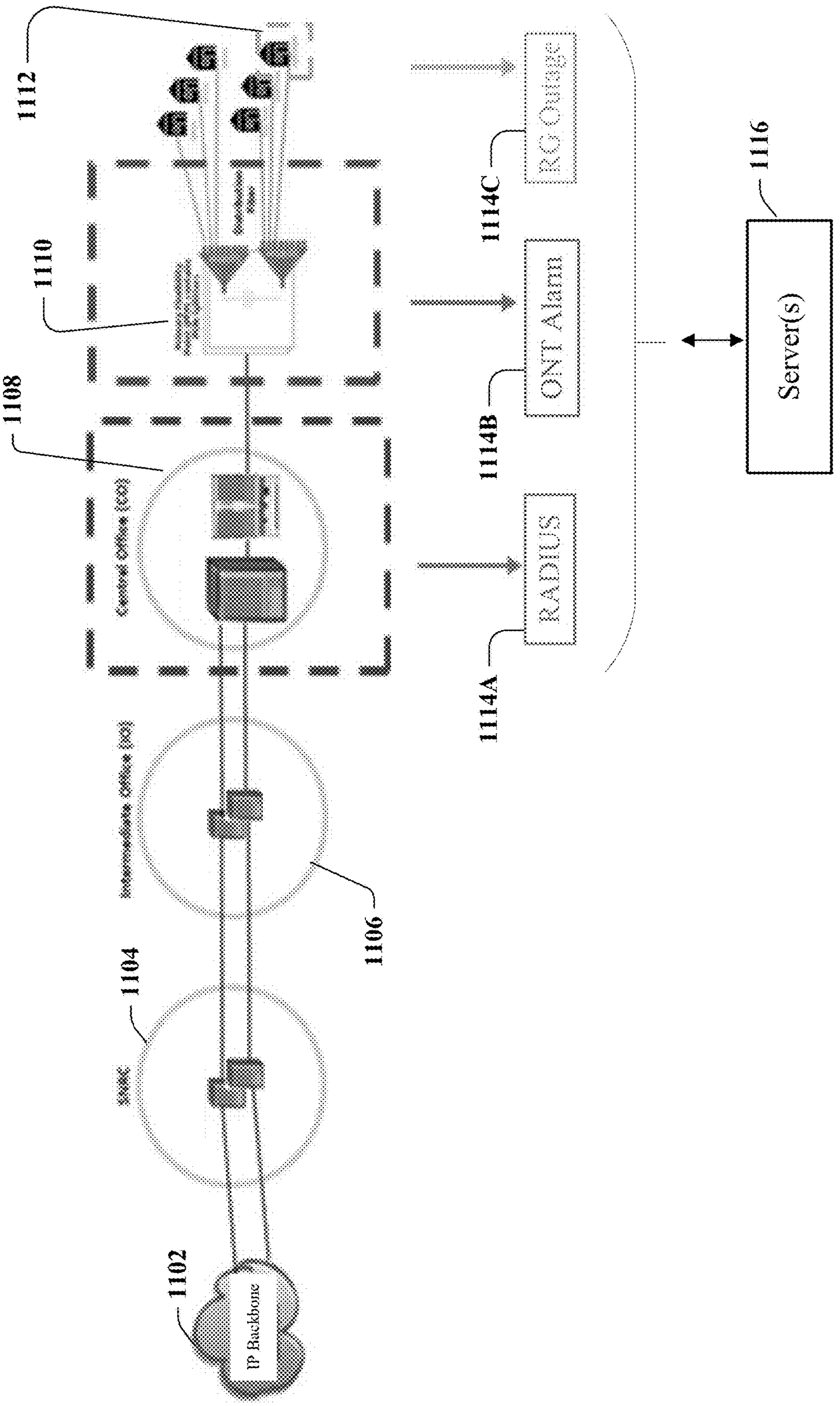
FIG. 1B is a block diagram illustrating an example, non-limiting embodiment of a system in accordance with various aspects described herein.

Referring now to FIG. 1B, this figure shows a system 1100 in which a customer's service reliability is assessed. As seen, system 1100 includes Carrier National IP Backbone 1102, which is configured for communication with Single Node Routing Complex (SNRC) 1104. Further SNRC 1104 is configured for communication with Intermediate Office (IO) 1106, which in turn is configured for communication with Central Office (CO) 1108, which in turn is configured for communication with Primary Flexibility Point (PFP) 1110. This PFP 1110 includes a plurality of PON Splitters, each of which is configured for communication with a respective residence (a plurality of which are shown, and one of which has associated call-out number 1112). In one example, each of the residences can correspond to a GPON or an XGS PON. In one example, the residence 1112 can have a residential gateway that corresponds to residential gateway 1004 of FIG. 1A).

Still referring to FIG. 1B, in order to obtain a reliable view of the service resiliency, the following error messages/data can be harnessed: Remote Authentication Dial-In User Services (RADIUS) data 1114A, Optical Network Terminal (ONT) alarm data 1114B, and Residential Gateway outage (RG outage) data 1114C. Each of these RADIUS data 1114A, ONT alarm data 1114B, and RG outage data 1114C can be provided to server(s) 1116. The server(s) 1116 receive the various error messages/data and (using techniques according to various embodiments described herein) determine, estimate, and/or predict communication system outages.

Referring now more specifically to the RADIUS data 1114A of FIG. 1B, as mentioned above, such RADIUS data traditionally covers the network segment between the Network Access Server (NAS) that is usually hosted in modem-like device such as Residential Gateway (RG) to a centralized authentication server that can be in Optical Line Terminal (OLT) offices. This RADIUS data 1114A implies at what time a customer terminates a valid connection and opens an authorized connection again. The gap time in between can be a good approximation of down time of the service.

Referring now more specifically to the ONT alarm data 1114B of FIG. 1B, as mentioned above, such ONT alarm data traditionally covers the segment between the NAS to Primary Flexibility Point (PFP) which can be a (curbside) cabinet that hosts the fiber optical splitters. The ONT alarm data usually monitors the errors when translating optical signals to electronic power signals (and their relevant firmware errors). The ONT alarm data can also capture a significant amount of outage events because many ONT alarms can be triggered by disruptions of connections.

Referring now more specifically to the RG outage data 1114C of FIG. 1B, as mentioned above, such RG outage data traditionally covers the RG status that is configured intrinsically inside the RG firmware. RG outage data is typically recorded by monitoring the health of RG connectivity. Such connectivity is traditionally implemented by constantly sending light-weight HTTP requests from RGs to backend servers. If the backend servers haven't received the request during a certain period (e.g., 3 min), an outage alarm will be recorded with the starting time. And a corresponding outage ending time will be recorded once the backend servers again receive the HTTP request afterwards. The absence of requests captures errors not only between fiber lines but also software issues inside the RG.

In various embodiments, multiple data sources (see, e.g. the three data sources of FIG. 1B), can be integrated to facilitate a robust view of a customer's connection stability over a wide range of time horizon. This can be accomplished, for example, by intersecting the outage events that have a common (or nearly common) time and associating the outage events to a given billing account number (BAN). In one example, the longest time span after joining these events from the three sources can be picked and such longest time span can be considered as the outage time. In another embodiment, corresponding contact call ticket(s) and/or dispatch ticket(s) can be selected to further understand the issue of connection reliability (in one specific example, each of the contact call ticket(s) and dispatch ticket(s) can be text data). Each of the contact call ticket(s) and/or dispatch ticket(s) can be tied to other data discussed herein (e.g., RADIUS data, ONT alarm data, and/or RG outage data) via correspondence with a unique identifier (e.g., unique BAN). In one specific example, the various data (and the contact call ticket(s) and/or dispatch ticket(s)) can be stored in a database (e.g., stored in one or more tables).

Figure 1C:
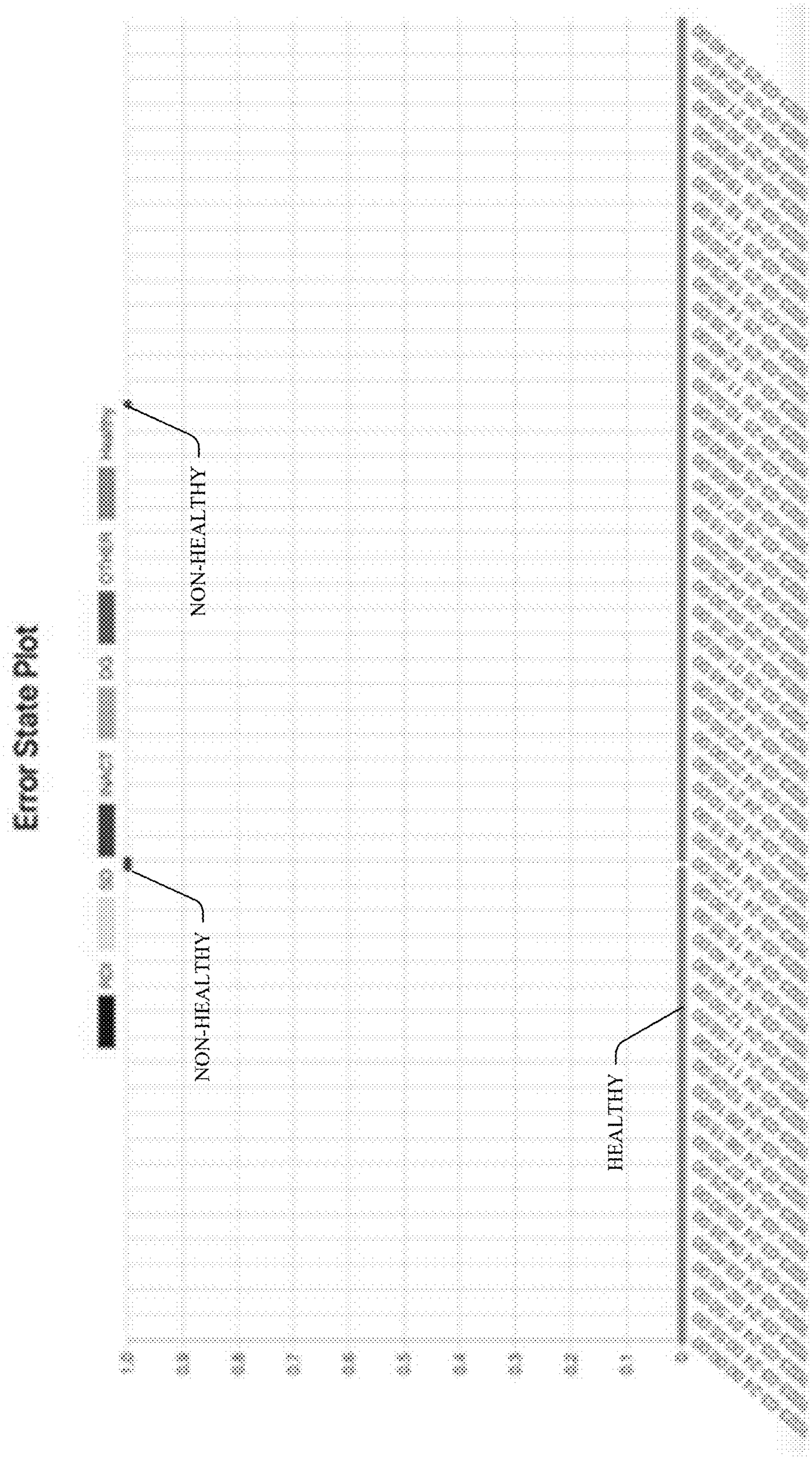
FIG. 1C is an example error state plot of an embodiment in accordance with various aspects described herein.
Figure 1E:
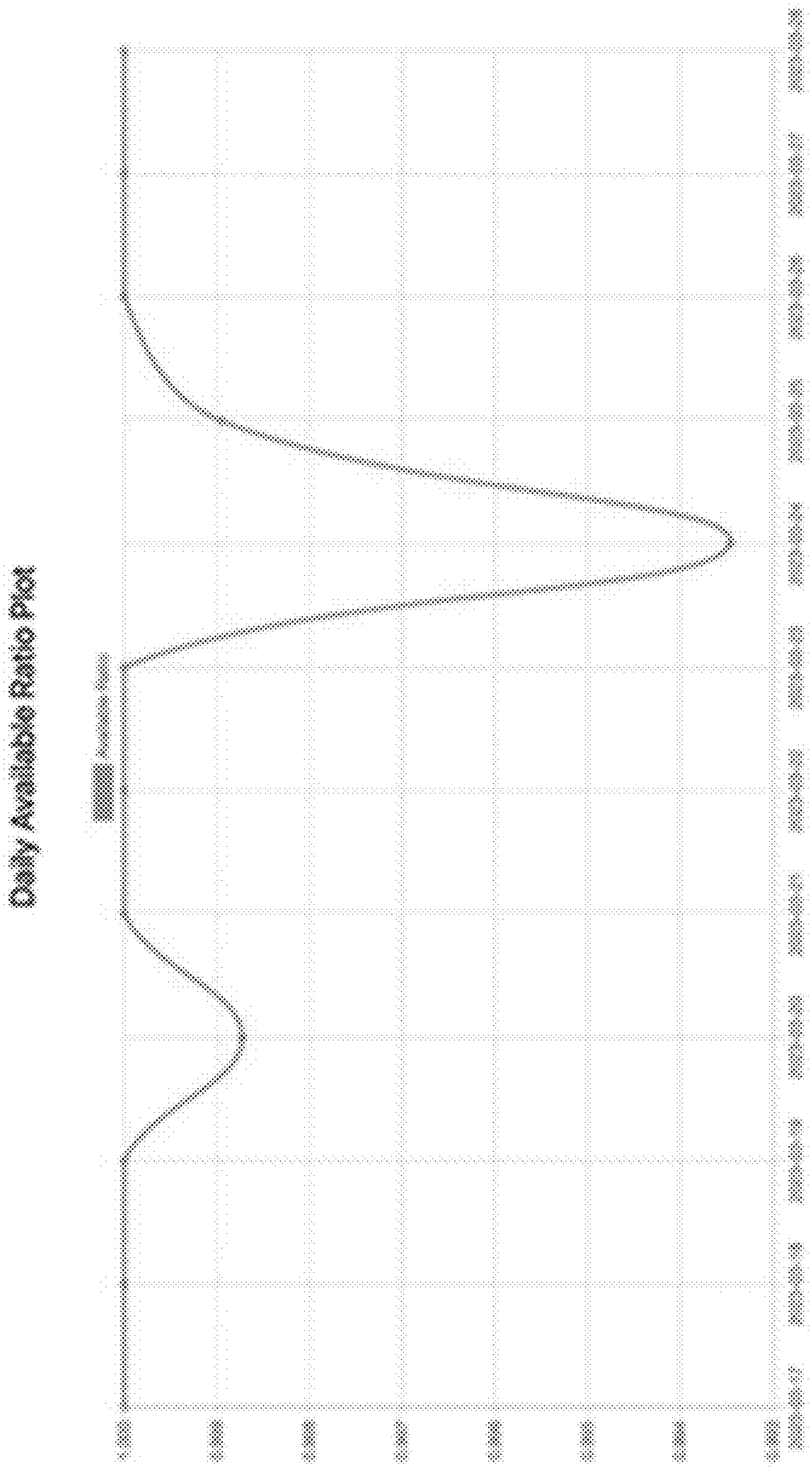
FIG. 1E is an example daily available ratio plot of an embodiment in accordance with various aspects described herein.
Figure 1F:
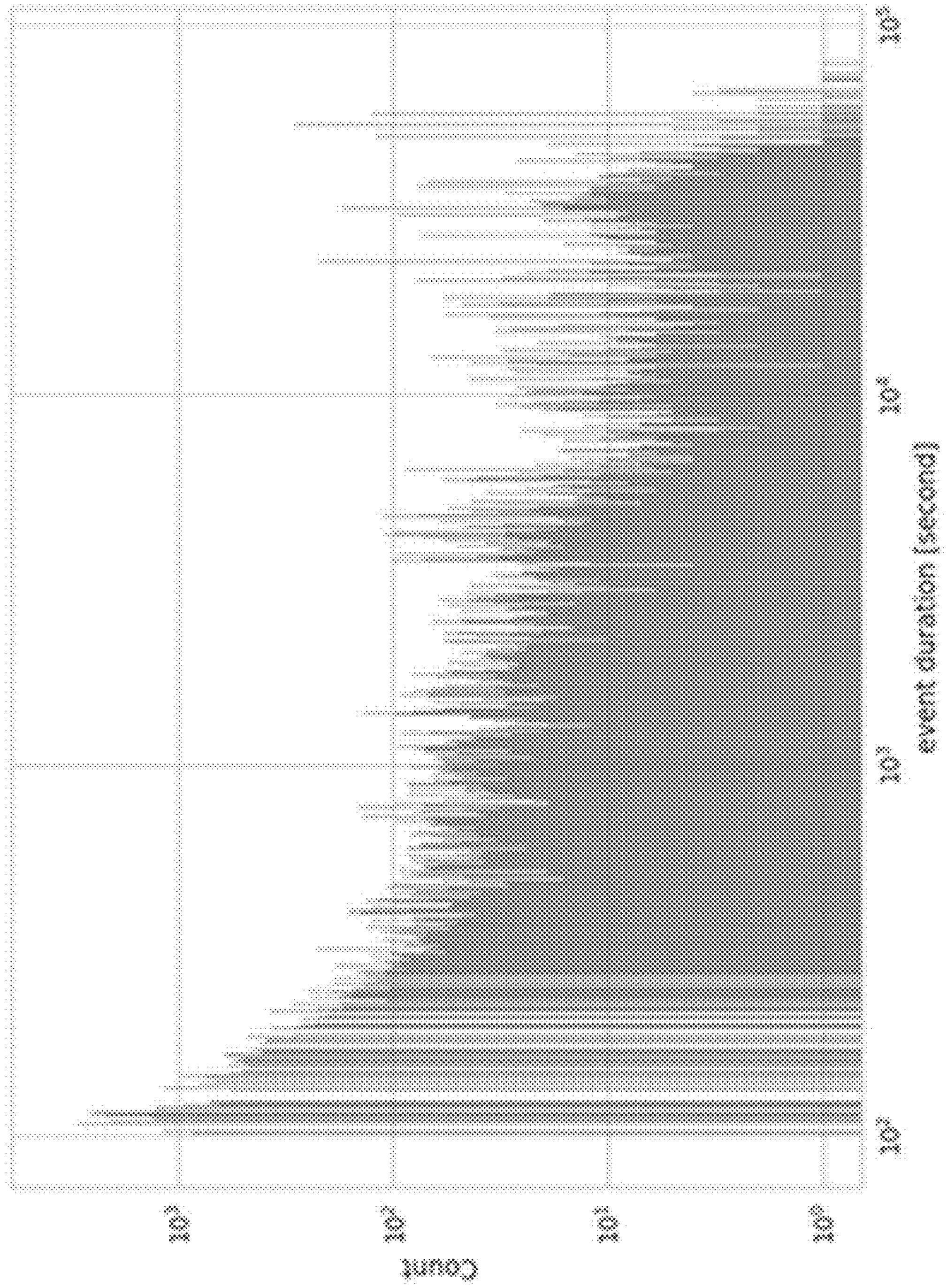
FIG. 1F is an example event duration histogram plot of an embodiment in accordance with various aspects described herein.

Referring now to FIGS. 1C, 1D, and 1F, various embodiments provide a backend process including several functionalities that provide a time series of the error/outage events, summary statistics (such as mean, min, max, and sum duration of error events that a customer had experienced), and a time series of the "daily availability" of a customer's service (such "daily availability" is described in more detail below).

Referring now more specifically to FIG. 1C, it is seen that event records (having timestamps given along the x-axis and "healthy" ("0") or "non-healthy" ("1") indications given along the y-axis) are converted (according to this embodiment) into a sequence data trace at the granularity of seconds (wherein the non-recorded seconds are treated as the healthy state). Thus, a customer's daily connection status can be determined by stitching up those second-by-second traces. Such a high-fidelity time series provides the flexibly to choose various time granularity to view the connection states (for example, from minutes to days, by up sampling appropriately). As seen (in this example of ONT error alarms sequence) there are two non-healthy data points with the majority of data points being healthy.

Referring now more specifically to FIG. 1D, it is seen that a summary of outage events (e.g., presented as a summary table of ONT alarm events) can indicate how frequently a customer has issues and how long those issues could last.

Referring now more specifically to FIG. 1E, in order to provide (according to an embodiment) an intuitive view of service reliability, a metric called "daily availability" is defined. This "daily availability" metric is quantified by uptime divided by one-day horizon. This ratio tells how much portion of a day the connection is up. Expanding this ratio over a long horizon indicates how reliable the connection is for a customer. The daily availability ratio plot in FIG. 1E shows an example with one relatively minor outage and one more major outage (the x-axis is a range of dates; the y-axis is the ratio calculated by using uptime divided by one day).

In various embodiments, a web interface is provided that allows machine programs to make calls. These calls can be in the form of HTTP requests, and JavaScript Object Notation (JSON) responses can be provided to show the information. In various embodiments, a web portal can allow a user to adjust different time range(s) and query granularity (e.g., from minutes or hours to days). After receiving the query results, the web portal can show both contact and dispatch tickets (if there are any), as well as the information calculated/determined as described herein (e.g., from a backend process and displayed such as shown in FIGS. 1C, 1D, 1E).

As described herein, various embodiments can provide a multi-modal reliability management platform (e.g., for wireline service). Elements of such a multi-modal reliability management platform can comprise: (a) A database that includes service outage records; (b) A backend processing module; (c) A user interface that indicates historical connection status; (d) A frontend web portal that is coupled with user-specific service reliability information; and/or (e) A set of key metrics that reflect the connection stability of the service (e.g., over a certain time horizon).

As described herein, various embodiments can provide for data ingestion and processing pipelines that take multiple user inputs (and other relevant imported files) to generate customized statistical indicators in aggregate. Such aggregated statistical indicators can reveal, for example, overall trend and pattern in a given population.

As described herein, various embodiments can process and relate information from multiple resources and modalities (e.g., optical network error codes, network layer error events, and text of tickets, etc.) to capture the near-to-real-time connection stability and the long-term historical connection resiliency for both individual customers and groups of customers in aggregate.

Figure 1G:
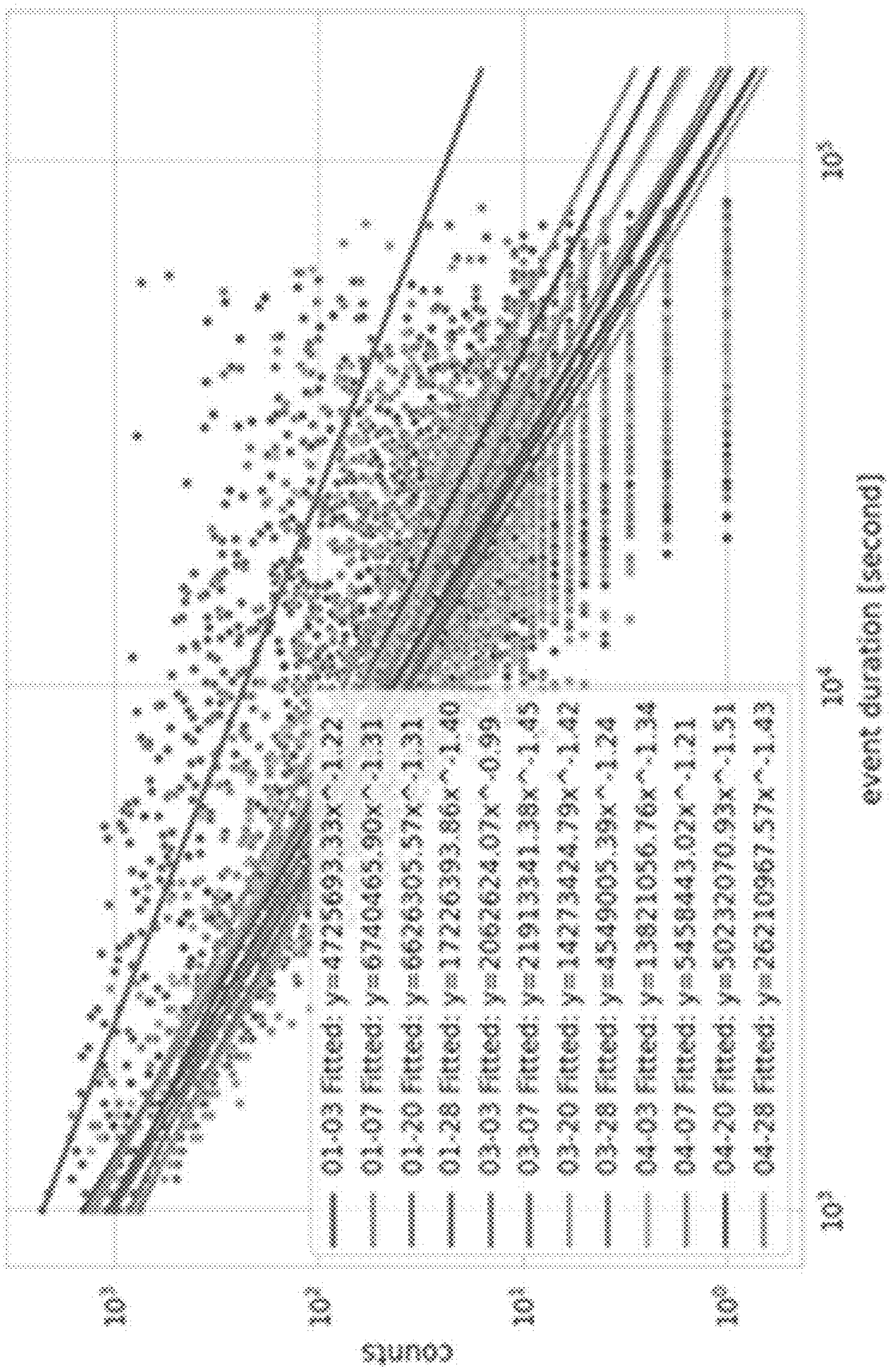
FIG. 1G is an example event duration plot of an embodiment in accordance with various aspects described herein.

As described herein, various embodiments can provide a mechanism to obtain deep network insights by collecting and assessing large amounts of outage events. Such embodiments provide various statistical analyses of outages at different times (e.g., on different days) and/or on different aggregated levels (e.g., by topological connecting nodes, by regional geolocations, etc.). In this regard, an example one-day snapshot of outage duration distribution (as known as empirical histogram) is shown in FIG. 1F. This figure shows the log-log scale of outage event frequency count over the event durations ranging from 100 seconds to 100000 seconds. As shown in the figure it roughly follows the linear trend of log-log scale, which leads to fitting of a power scaling law model for the outage events (i.e., $y=ax^b$, where a and b are the fitting parameters). As consequence, FIG. 1G shows the power law model fitting results over multiple days (from January 2023 to April 2023) for the events ranging between 1000 seconds (about 16~17 minutes) to 100000 seconds. Those long duration outages are important because they often cause significant negative impact for connection service. It can be seen in this figure, for example, that on 2023 Mar. 3 appeared significantly more long-duration outages than other dates. Such a finding (and the corresponding temporal tracking capability) can be helpful to diagnose the issue of the connection service over multiple places that happened concurrently.

Figure 2A:
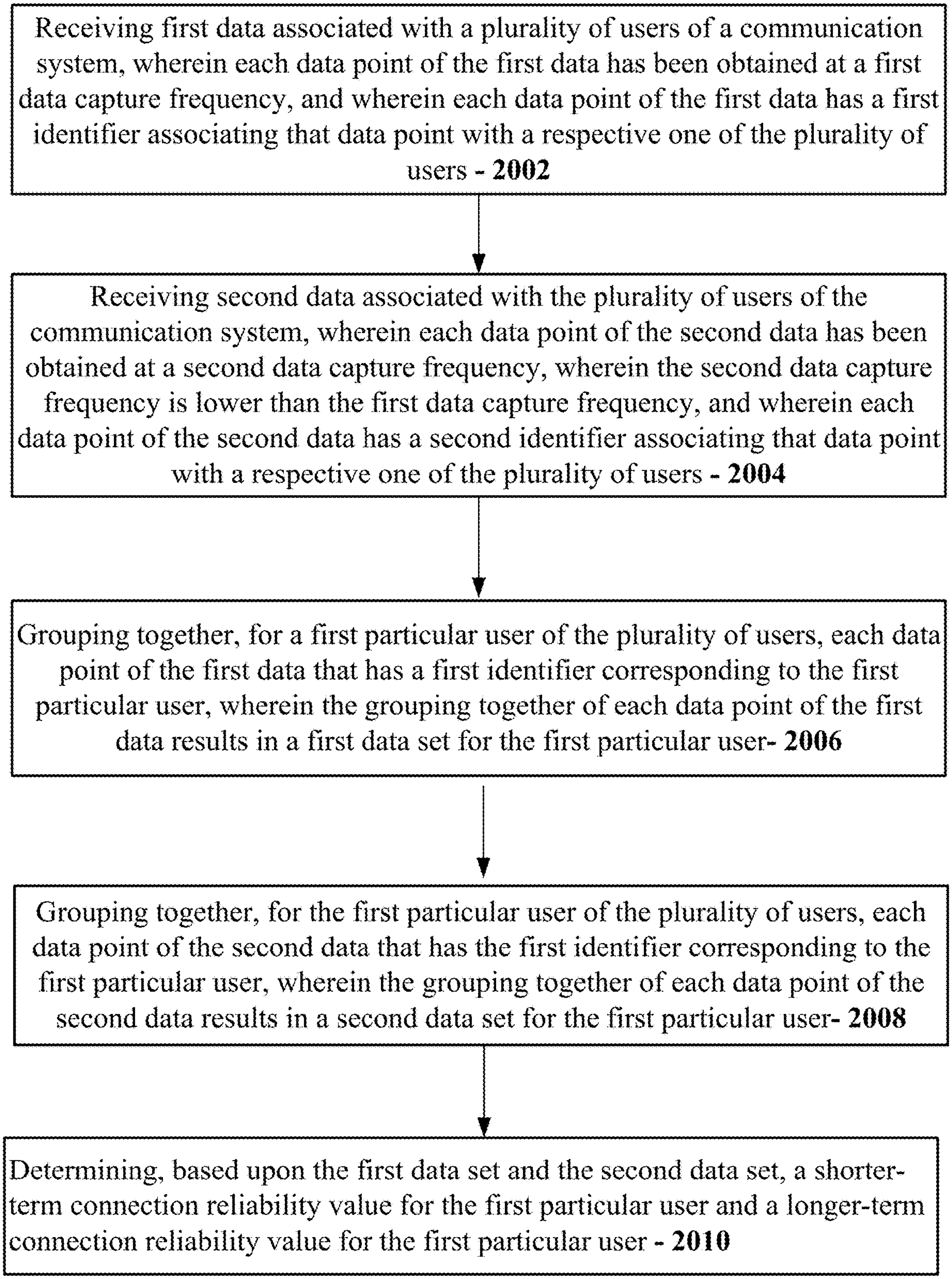
FIG. 2A depicts an illustrative embodiment of a method in accordance with various aspects described herein.

Referring now to FIG. 2A, various steps of a method 2000 according to an embodiment are shown. As seen in this FIG. 2A, step 2002 comprises receiving first data associated with a plurality of users of a communication system, wherein each data point of the first data has been obtained at a first data capture frequency, and wherein each data point of the first data has a first identifier associating that data point with a respective one of the plurality of users. Next, step 2004 comprises receiving second data associated with the plurality of users of the communication system, wherein each data point of the second data has been obtained at a second data capture frequency, wherein the second data capture frequency is lower than the first data capture frequency, and wherein each data point of the second data has a second identifier associating that data point with a respective one of the plurality of users. Next, step 2006 comprises grouping together, for a first particular user of the plurality of users, each data point of the first data that has a first identifier corresponding to the first particular user, wherein the grouping together of each data point of the first data results in a first data set for the first particular user. Next, step 2008 comprises grouping together, for the first particular user of the plurality of users, each data point of the second data that has the first identifier corresponding to the first particular user, wherein the grouping together of each data point of the second data results in a second data set for the first particular user. Next, step 2010 comprises determining, based upon the first data set and the second data set, a shorter-term connection reliability value for the first particular user and a longer-term connection reliability value for the first particular user.

While for purposes of simplicity of explanation, the respective processes are shown and described as a series of blocks in FIG. 2A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2B, various steps of a method 2100 according to an embodiment are shown. As seen in this FIG. 2B, step 2102 comprises obtaining first data associated with a plurality of users of a communication system, wherein the first data comprises a first plurality of data points, wherein each of the first plurality of data points was captured at a first periodicity, and wherein each of the first plurality of data points has an identifier associating that data point with a respective one of the plurality of users. Next, step 2104 comprises obtaining second data associated with the plurality of users of the communication system, wherein the second data comprises a second plurality of data points, wherein each of the second plurality of data points was captured at a second periodicity, wherein the second periodicity is longer than the first periodicity, and wherein each of the second plurality of data points has an identifier associating that data point with a respective one of the plurality of users. Next, step 2106 comprises grouping together, for each user of the plurality of users, each data point of the first plurality of data points that has an identifier corresponding to that user, wherein the grouping together of each data point of the first plurality of data points results in a respective first data set for that user. Next, step 2108 comprises grouping together, for each user of the plurality of users, each data point of the second plurality of data points that has an identifier corresponding to that user, wherein the grouping together of each data point of the second plurality of data points results in a respective second data set for that user. Next, step 2110 comprises predicting, based upon the first data set and the second data set, a future service disruption for a particular user of the plurality of users.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
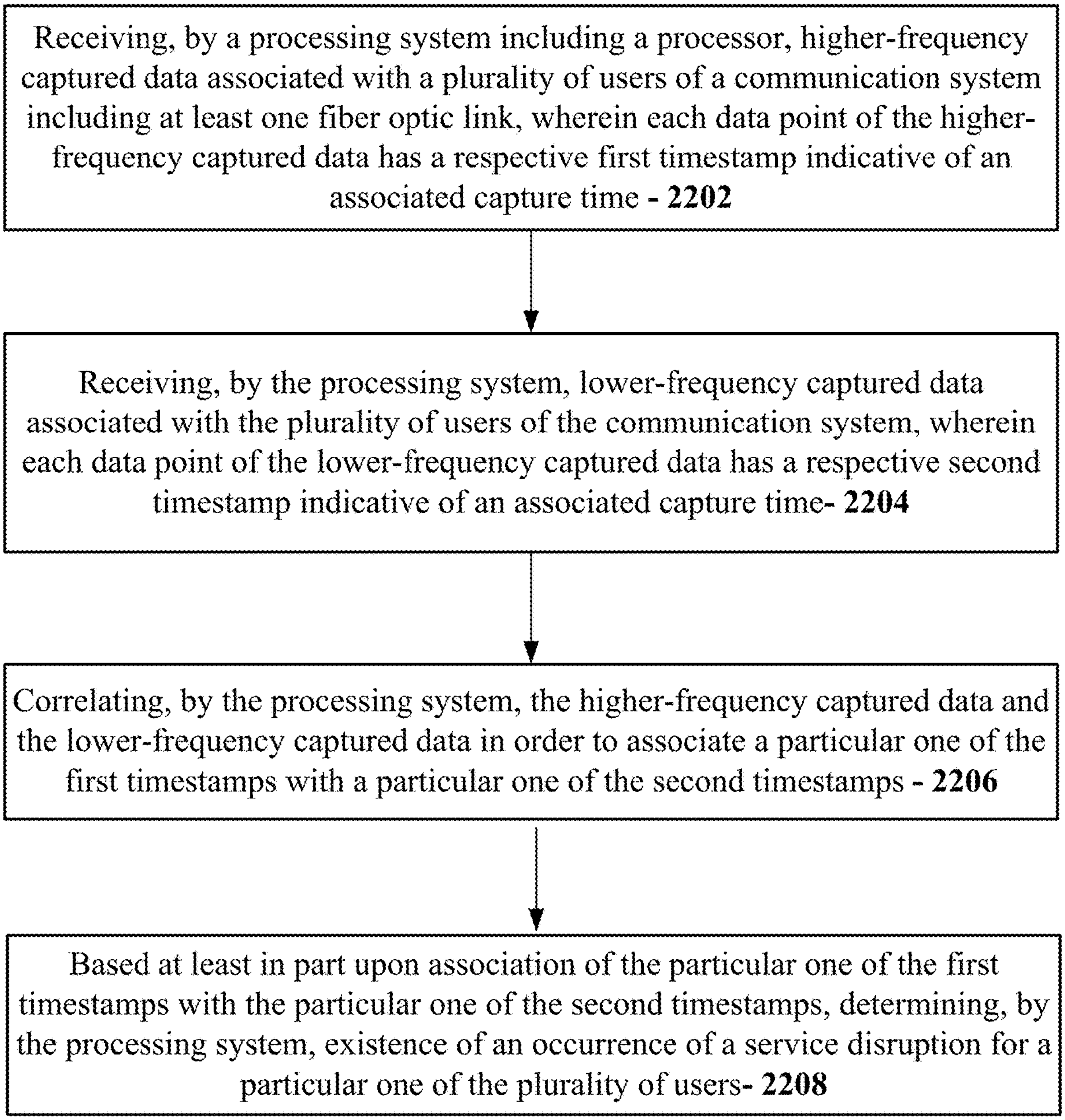
FIG. 2C depicts an illustrative embodiment of a method in accordance with various aspects described herein.

Referring now to FIG. 2C, various steps of a method 2200 according to an embodiment are shown. As seen in this FIG. 2C, step 2202 comprises receiving, by a processing system including a processor, higher-frequency captured data associated with a plurality of users of a communication system including at least one fiber optic link, wherein each data point of the higher-frequency captured data has a respective first timestamp indicative of an associated capture time. Next, step 2204 comprises receiving, by the processing system, lower-frequency captured data associated with the plurality of users of the communication system, wherein each data point of the lower-frequency captured data has a respective second timestamp indicative of an associated capture time. Next, step 2206 comprises correlating, by the processing system, the higher-frequency captured data and the lower-frequency captured data in order to associate a particular one of the first timestamps with a particular one of the second timestamps. Next, step 2208 comprises based at least in part upon association of the particular one of the first timestamps with the particular one of the second timestamps, determining, by the processing system, existence of an occurrence of a service disruption for a particular one of the plurality of users.

In one embodiment, the association of the particular one of the first timestamps with the particular one of the second timestamps is based upon the particular one of the first timestamps being within a non-zero threshold time period (e.g., 30 seconds) relative to the particular one of the second timestamps.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide for evaluating residential customers' fiber connection reliability (e.g., using multi-modal methods and apparatus). This approach (according to various embodiments) cross-validates multiple nodes and layers in both an aggregated view according to the network connections and a temporal view according to chronic changes. By using these embodiments, it can be quickly determined (e.g., in real-time) if a customer is experiencing a unique abnormal incident or a massive common issue without checking multiple resources respectively from different endpoints. In contrast, as described herein, certain conventional mechanisms either focus on an individual user incident detection or focus on large-scale network failures instantaneously. However, such conventional mechanisms typically require multiple resources and steps to confirm and validate root cause of issues, which may take many hours or even days.

As described herein, various embodiments can assess both a long range historical and near-to-real time status of connection issues that stem from the segment between a Residential Gateway and central connection hubs that host switches and routers. Such an assessment can enhance the network infrastructure (e.g., to avoid common and repetitive issues across various places and over a certain time). Moreover, various embodiments can help operators (e.g., an operation team) to understand typical connection errors and corresponding call and/or dispatch workflow (e.g., so that more accurate cost estimation can be made and/or cost reduction can be achieved if an alternative solution is less expensive).

As described herein, various embodiments can provide a web tool that incorporates multi-modal data (e.g., such as Optical Network Terminal (ONT) alarm data that represents the status of physical layer of the connection, along with other type(s) of data).

As described herein, various embodiments can utilize data of differing time horizons. Thus, the longer-horizon data can help find one or more issues that could be overlooked in the shorter-horizon data and, similarly, the shorter-horizon data can help find one or more issues that could be overlooked in the longer-horizon data.

As described herein, various embodiments can utilize text tickets from the historical dispatch tickets and customer care tickets to make connectivity issue determinations and/or predictions.

As described herein, various embodiments can provide for data validation (e.g., using the text tickets from the historical dispatch record and/or customer care call tickets) to better understand issues.

As described herein, various embodiments can provide for using multiple data sources with machine feedback (and/or human feedback loop) to cross validate results.

As described herein, various embodiments can facilitate early repairs and/or early situation awareness.

As described herein, various embodiments can provide early warnings in the case of, for example, a seasonality issue (e.g., due to a regional temperature and/or weather condition), a storm, and/or an infrastructure failure (e.g., a cut fiber).

As described herein, various embodiments can utilize various data to assess the fiber service reliability (e.g., by calculating a number of critical metrics and checking their short-term and long-term trends).

As described herein, various embodiments can provide for assessing the network service reliability (e.g., the reliability between the core network to the individual customer's gateway).

As described herein, various embodiments can provide for evaluating data from multiple data sources that stem from various segments of a wireline network.

Figure 3:
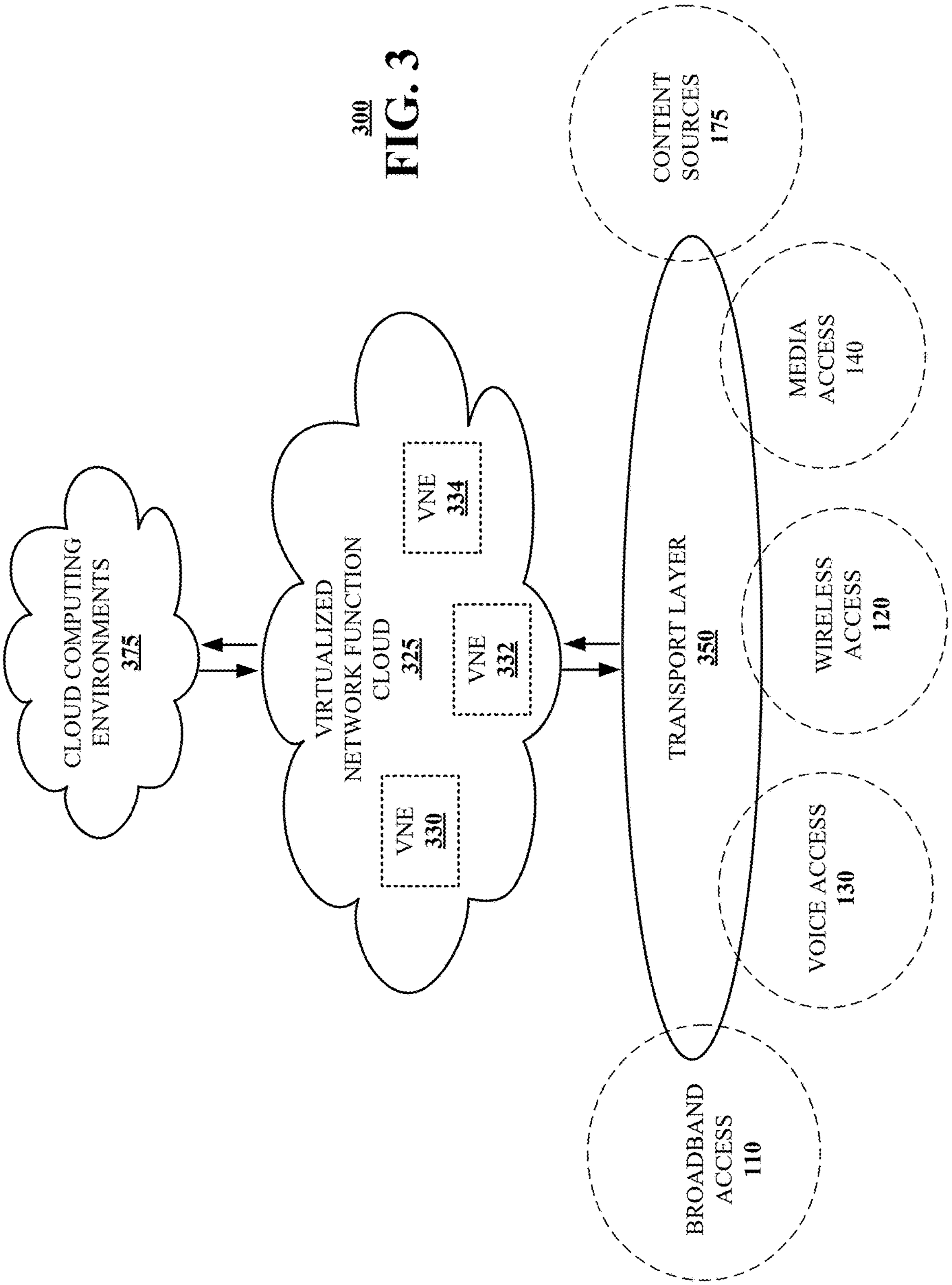
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 1000, some or all of the subsystems and functions of system 1100, and/or some or all of the functions of methods 2000, 2100, 2200. For example, virtualized communication network 300 can facilitate in whole or in part evaluating fiber connection reliability (e.g., fiber connection reliability for residential customers) using multi-modal data and/or multi-modal data sources.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element, such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
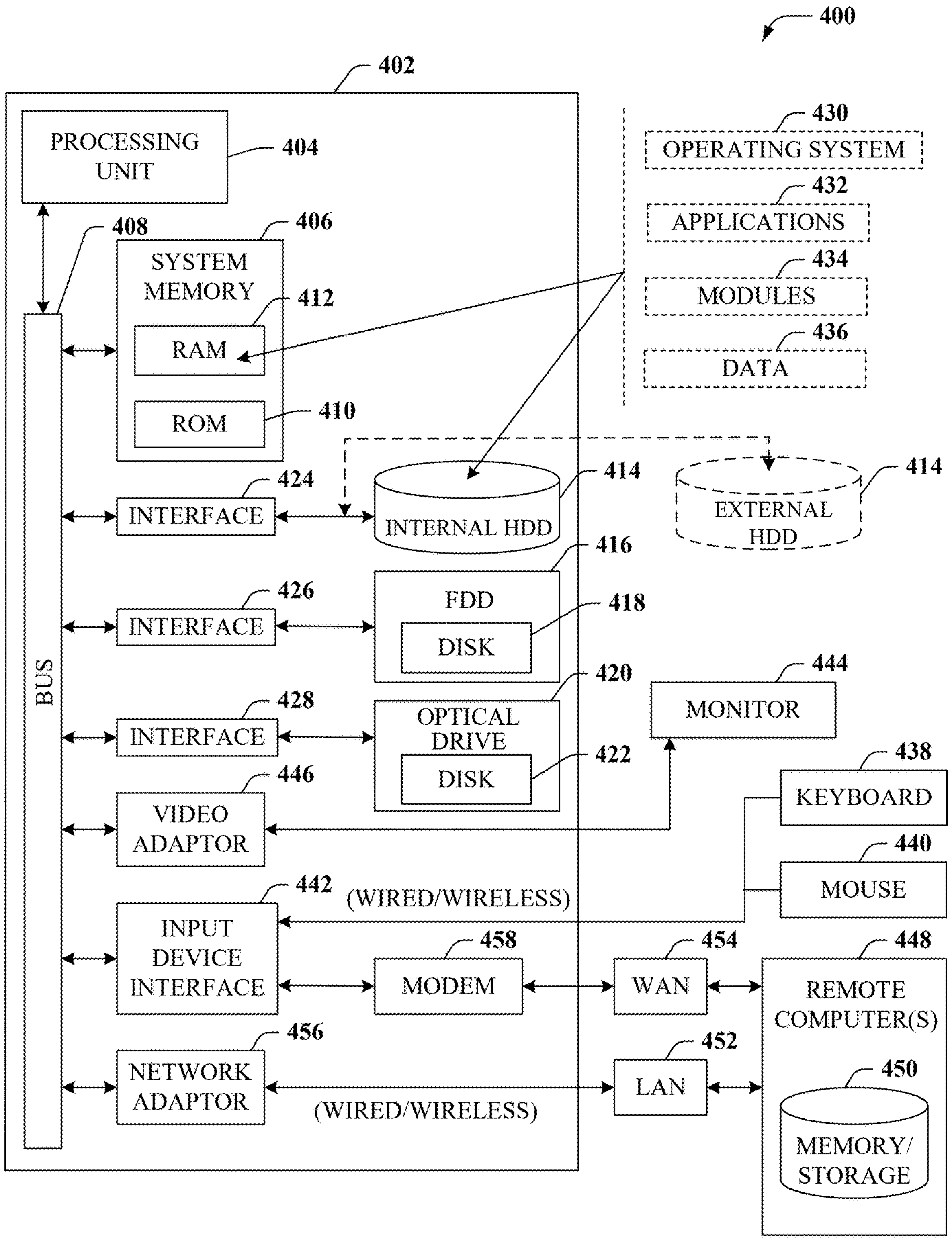
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements, access terminal, base station or access point, switching device, media terminal, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part evaluating fiber connection reliability (e.g., fiber connection reliability for residential customers) using multi-modal data and/or multi-modal data sources.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically evaluating fiber connection reliability (e.g., fiber connection reliability for residential customers) using multi-modal data and/or multi-modal data sources) can employ various AI-based schemes for carrying out various embodiments thereof. Moreover, the classifier can be employed to determine a ranking or priority of each user, customer, subscriber, residential gateway, and/or fiber connection. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the user(s), customer(s), subscriber(s), residential gateway(s), and/or fiber connection(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving first data associated with a plurality of users of a communication system, wherein each data point of the first data has been obtained at a first data capture frequency, and wherein each data point of the first data has a first identifier associating that data point with a respective one of the plurality of users;

receiving second data associated with the plurality of users of the communication system, wherein each data point of the second data has been obtained at a second data capture frequency, wherein the second data capture frequency is lower than the first data capture frequency, and wherein each data point of the second data has a second identifier associating that data point with a respective one of the plurality of users;

grouping together, for a first particular user of the plurality of users, each data point of the first data that has a first identifier corresponding to the first particular user, wherein the grouping together of each data point of the first data results in a first data set for the first particular user;

grouping together, for the first particular user of the plurality of users, each data point of the second data that has the first identifier corresponding to the first particular user, wherein the grouping together of each data point of the second data results in a second data set for the first particular user; and determining, based upon the first data set and the second data set, a shorter-term connection reliability value for the first particular user and a longer-term connection reliability value for the first particular user.

2. The device of claim 1, wherein:

the shorter-term connection reliability value is associated with a real-time horizon, a near real-time horizon, or any combination thereof; and the longer-term connection reliability value is associated with a time horizon spanning one or more days, one or more weeks, one or more months, or any combination thereof.

3. The device of claim 1, wherein:

the first data capture frequency is one of seconds, minutes, hours, or any combination thereof; and the second data capture frequency is one of days, weeks, months, or any combination thereof.

4. The device of claim 1, wherein:

each of the plurality of users is associated with respective residential gateway equipment; and each data point of the first data is obtained by a respective one of the residential gateway equipment.

5. The device of claim 4, wherein:

each data point of the second data is obtained by networking equipment that is upstream of the residential gateway equipment.

6. The device of claim 1, wherein the communication system comprises a wired communication system.

7. The device of claim 6, wherein the wired communication system comprises one or more fiber optic links.

8. The device of claim 1, wherein the operations further comprise:

grouping together, for a second particular user of the plurality of users, each data point of the first data that has a second identifier corresponding to the second particular user, wherein the grouping together of each data point of the first data for the second particular user results in a third data set for the second particular user;

grouping together, for the second particular user of the plurality of users, each data point of the second data that has the second identifier corresponding to the second particular user, wherein the grouping together of each data point of the second data for the second particular user results in a fourth data set for the second particular user; and determining, based upon the third data set and the fourth data set, another shorter-term connection reliability value for the second particular user and another longer-term connection reliability value for the second particular user.

9. The device of claim 1, wherein each of the plurality of users of the communication system comprises a customer, a subscriber, or any combination thereof.

10. The device of claim 9, wherein the first identifier corresponds to an account of the first particular user.

11. The device of claim 10, wherein the first identifier is in a form of a billing account number.

12. The device of claim 1, wherein:

the first particular user is served by a residential gateway (RG); and the RG provides connectivity to a computer of the first particular user, a tablet of the first particular user, a smartphone of the first particular user, or any combination thereof.

13. The device of claim 1, wherein the communication system provides to the first particular user Internet connectivity.

14. The device of claim 13, wherein the Internet connectivity is provided to user equipment of the first particular user through a core network residing between a residential gateway (RG) and the public Internet.

15. A non-transitory machine-readable medium, comprising executable instructions that, when executed by a processing system including a processor, facilitate performance of operations, the operations comprising:

obtaining first data associated with a plurality of users of a communication system, wherein the first data comprises a first plurality of data points, wherein each of the first plurality of data points was captured at a first periodicity, and wherein each of the first plurality of data points has an identifier associating that data point with a respective one of the plurality of users;

obtaining second data associated with the plurality of users of the communication system, wherein the second data comprises a second plurality of data points, wherein each of the second plurality of data points was captured at a second periodicity, wherein the second periodicity is longer than the first periodicity, and wherein each of the second plurality of data points has an identifier associating that data point with a respective one of the plurality of users;

grouping together, for each user of the plurality of users, each data point of the first plurality of data points that has an identifier corresponding to that user, wherein the grouping together of each data point of the first plurality of data points results in a respective first data set for that user;

grouping together, for each user of the plurality of users, each data point of the second plurality of data points that has an identifier corresponding to that user, wherein the grouping together of each data point of the second plurality of data points results in a respective second data set for that user; and predicting, based upon the first data set and the second data set, a future service disruption for a particular user of the plurality of users.

16. The non-transitory machine-readable medium of claim 15, wherein the predicting predicts the future service disruption by date, by hour of the day, by day of the week, by month of the year, or any combination thereof.

17. The non-transitory machine-readable medium of claim 15, wherein:

the predicting predicts a length of time of the future service disruption; and the length of time is at a granularity level of seconds, minutes, hours, or days.

18. A method, comprising:

receiving, by a processing system including a processor, higher-frequency captured data associated with a plurality of users of a communication system including at least one fiber optic link, wherein each data point of the higher-frequency captured data has a respective first timestamp indicative of an associated capture time;

receiving, by the processing system, lower-frequency captured data associated with the plurality of users of the communication system, wherein each data point of the lower-frequency captured data has a respective second timestamp indicative of an associated capture time;

correlating, by the processing system, the higher-frequency captured data and the lower-frequency captured data in order to associate a particular one of the first timestamps with a particular one of the second timestamps; and based at least in part upon association of the particular one of the first timestamps with the particular one of the second timestamps, determining, by the processing system, existence of an occurrence of a service disruption for a particular one of the plurality of users.

19. The method of claim 18, wherein the association of the particular one of the first timestamps with the particular one of the second timestamps is based upon the particular one of the first timestamps being within a non-zero threshold time period relative to the particular one of the second timestamps.

20. The method of claim 18, wherein the existence of the occurrence of the service disruption for the particular one of the plurality of users is based upon the particular one of the plurality of users having an account identifier that is a same account identifier as that associated with a data point having the particular one of the first timestamps and a data point having the particular one of the second timestamps.

* * * * *